Feb. 1, 1955 G. W. GRAY 2,701,311

CATHODE-CONTROLLED WAVE GENERATOR

Filed Dec. 21, 1951

INVENTOR
George W. Gray
BY Morris B. Pebkin
ATTORNEY

United States Patent Office 2,701,311

Patented Feb. 1, 1955

2,701,311

CATHODE-CONTROLLED WAVE GENERATOR

George W. Gray, Lambertville, N. J., assignor to Radio Corporation of America, a corporation of Delaware Application December 21, 1951, Serial No. 262,846

6 Claims. (Cl. 250—36)

This invention relates to electrical wave generators and, more particularly, to an improvement in multivibrators.

There has been filed, on December 29, 1950, an application for "Cathode-Controlled Wave Generators," Serial No. 203,317, by this inventor. Therein is described and claimed a novel multivibrator of the type employing two tubes having their anodes and control grids cross-connected. The tubes have anode loads and cathode impedances. The values of the cross coupling components are selected to have time constants which are as large as, or greater than, the oscillation frequency of the multivibrator. The cathode impedances are selected to exceed the anode load impedances. Accordingly, as explained in the application, the frequency of oscillation is determined by a capacitor coupled between the cathodes of the two tubes. Since the gain produced in the regenerative feed-back loop comprising the grid-anode circuits of the tubes is less than unity, it is the additional regenerative feed-back circuit completed by the cathode coupling oscillator which is effective to make the multivibrator oscillate.

In order to change the frequency of oscillation of the generator, the value of the cathode coupling capacitor may be changed. For wide range frequency changes it has been necessary to switch in and out various combinations of capacitors between the cathodes of the multivibrator since a single variable capacitor is not large enough to cover the range of frequencies obtainable. This switching does not permit stepless or continuous wide range frequency control. Further, a mechanical switch must be used which prevents too rapid switching between frequencies.

Accordingly, it is an object of the present invention to provide a novel and improved cathode coupled multivibrator.

It is a further object of the present invention to provide a cathode coupled multivibrator having a stepless wide frequency range.

It is still a further object of the present invention to provide a wide frequency range cathode coupled multivibrator which does not require mechanical switching for frequency changes.

It is yet another object of the present invention to provide a simple and useful wide frequency range square wave generator.

These and further objects of the invention are achieved, in a cathode coupled multivibrator of the type described, by connecting in parallel with a first cathode coupling condenser a second condenser connected in series with a variable resistance means. The variable resistance means may be a potentiometer, a "Thyrite" element or an electronic device. As the resistance of the variable resistance means is varied from a minimum to a maximum, the capacitance value of the coupling between the multivibrator cathodes changes from substantially that of the two condensers in parallel to that of the first cathode coupling condenser. The frequency of the multivibrator or square wave generator is varied accordingly from a minimum to a maximum.

The novel features of the invention as well as the invention itself, both as to its organization and method of operation, will best be understood from the following description, when read in connection with the accompanying drawings in which.

Figure 1:
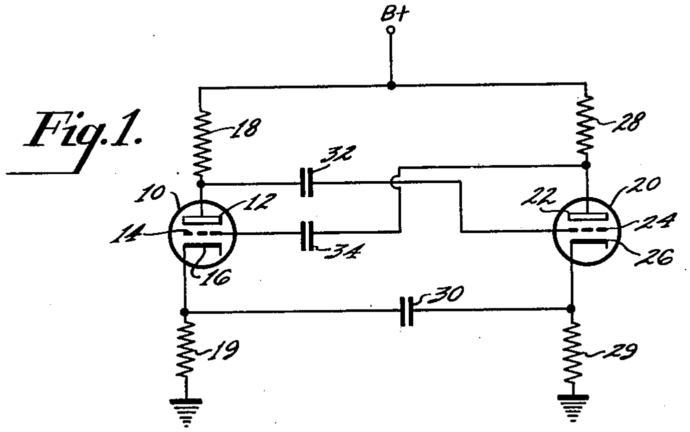
Figure 1 is a circuit diagram of the basic cathode coupled multivibrator.

Referring now to Figure 1 of the drawing, there may be seen a schematic diagram of the basic cathode-coupled multivibrator which is also shown in the application referred to above. This consists of a first electron discharge tube 10 and a second electron discharge tube 20 which may be enclosed within the same tube envelope if desired. The first tube 10 has an anode load resistor 18 connected between the anode 12 and B+. The second tube has an anode load resistor 28 connected between the anode 22 and B+. A resistor 19 serves as a cathode load impedance for the cathode 16 of the first tube 10 and is connected between the cathode 16 and ground. A second resistor 29 serves as the cathode load impedance for the second tube 20 and is connected between cathode 26 and ground. The cross coupling network of the square wave generator consists of a first condenser 32 connected between the anode 12 of the first tube and the grid 24 of the second tube. A second condenser 34 is connected between the anode 22 of the second tube and the grid 14 of the first tube. The cathodes 16, 26 are coupled by means of a condenser 30 connected between them.

Grid return resistors may be omitted from this trigger circuit. The leakage through the grid coupling condenser and the gas current from the tubes is sufficient to make the grid tend to go positive. Accordingly, the circuit is operative without grid resistors and the cross coupling constant is longer. This is a desirable feature since it permits more linear low frequency response.

The impedance of the cathode load resistors 19, 29 is made at least equal to and preferably greater than the impedance of the resistors 18, 28 connected to the anodes. The selection of the cross coupling condensers 32, 34 is made so that the time constant of the cross coupling is long as compared to the period of oscillation of the multivibrator. The anode to grid cross couplings and the cathode coupling between the tubes provides two paths for regenerative action. The grid-anode cross couplings provide a regenerative action which is insufficient of itself to cause oscillation. Since the cathode load resistor is larger than the anode load resistor, the gain of the grid-anode cross coupled regenerative path is less than "1." Consequently, no oscillations will occur even through the phase of the feedback energy through the cross couplings between the tubes is of a regenerative character.

The inclusion of the cathode coupling condenser in the circuit, however, provides another regenerative feed-back loop which is effective to make the apparatus oscillate. The way in which the circuit including the coupling capacitor operates to produce this result may be explained as follows. Assume that the first tube 10 is conducting and that the second tube 20 is non-conducting. A portion of the space current, which is conducted by the first tube, traverses a circuit including the cross-coupling capacitor 30 and the second tube cathode load resistor 29. As the cross-coupling capacitor becomes charged, this current flow decreases in magnitude thereby causing the potential of the cathode 26 of the second tube to decrease toward ground potential. This potential change tends to render the second tube conductive. The rate at which this second tube cathode potential changes depends upon the time constant of the circuit and is determined principally by the cross-coupling capacitor and the second tube load resistor values.

Another portion of the space current in the first tube traverses the first tube cathode load resistor 19. This portion of the current, however, does not vary substantially. The resultant decrease in the total space current through the first tube causes a slight increase in a positive sense of the anode potential of the first tube 10. By means of the cross-coupling capacitor 32, this increased potential is impressed upon the control grid 24 of the second tube. This potential change also tends to render the second tube conductive.

It is seen, therefore, that the described potential changes of the control grid and cathode of the second tube 20 both are of the character necessary to render this tube conducting. The regenerative feed-back loop, including the cathode coupling capacitor 30, provides more than enough gain to produce oscillation. The grid-to-anode loop adds to the regeneration and thereby accelerates the described operation of the device, even though by itself it is insufficient to cause oscillation. As soon as space current begins to flow in the second tube, it increases to a maximum substantially instantaneously and space conduction in the first tube is terminated substantially instantaneously in the characteristic manner of multivibrators. The described cycle of operation is repeated during the next succeeding interval of time substantially in the manner described except that the current flow through the coupling capacitor 30 is in a direction opposite to that described. This current then traverses the cathode load resistor 19 of the first tube, as well as the space discharge path of the second tube.

The frequency of the cathode coupled multivibrator described is a function of the value of the coupling capacitor. It has been found that the frequency range over which this multivibrator is capable of oscillating is relatively large. Furthermore, the frequency change is substantially linear with changes in the value of the coupling capacitor over most of the range. For example, it was found that in one embodiment of the invention the frequency of oscillation of the multivibrator could be varied linearly from a frequency in excess of one megacycle to a frequency determined by the time constants of the anode-to-grid cross-coupling circuits. With the omission of the grid return resistors, this time constant was extended down into the region of one cycle per second.

Figure 2:
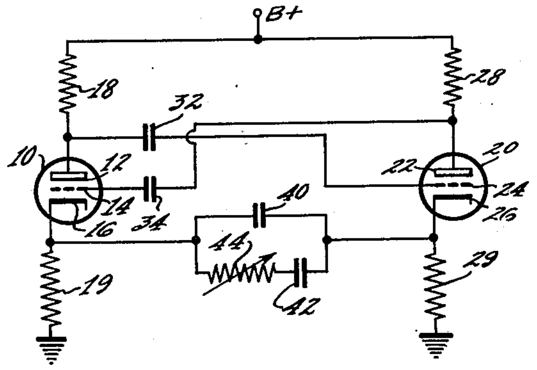
Figure 2 is a circuit diagram of one embodiment of the invention.

In order to take advantage of the range in frequency permitted by changing the value of the cathode coupling condenser 30, switching elements were used to switch between different valued condensers. In order to minimize the required number of capacitors, the switching elements were made so that these capacitors could be connected in series and/or parallel so that a greater frequency range could be covered with a fewer number of capacitors. The frequency change was not continuous but occurred in steps with the switching. The mechanical switch itself provides non-desirable features such as increased contact resistance with usage as well as deterioration. In order to show apparatus for obtaining a smooth, continuous, stepless frequency change, reference is made to the circuit diagram of Figure 2, wherein there is shown an embodiment of the invention capable of providing these features. The same reference numerals are applied in Figure 2 for similar functioning components as are applied in Figure 1. A frequency determining circuit is connected between the two cathodes 16, 26. This consists of a first capacitor 40 connected between the two cathodes 16, 26. A second capacitor 42 is connected in series with a variable resistor 44, such as a potentiometer. These two are then connected in parallel across the first condenser 40. It will be appreciated that, as the variable resistor 44 is increased to its maximum value, assuming a high value resistance has been selected for the potentiometer, the connections between the two cathodes are substantially made by the capacitance of the first condenser 40. As the resistance of the potentiometer 44 is decreased more and more of the second capacitor 42 is added in parallel to the first capacitor so that when the potentiometer is short-circuited, the value of the capacitance connected between the two cathodes is substantially the same as that of the two condensers 40, 42 in parallel. Accordingly, the frequency determining circuit varies in capacitance value from a minimum capacitance which is that of the first capacitor alone to a maximum value which is that of the two capacitors in parallel. The frequency is continuously varied over the range established by these capacitance values. A frequency range of 100,000 to one has been obtained in this fashion.

Figure 3:
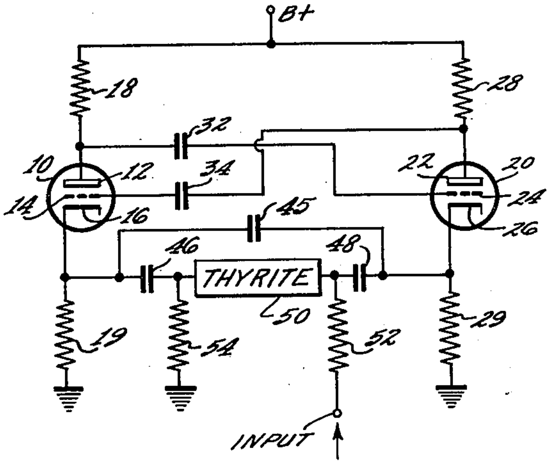
Figure 3 is a circuit diagram of another embodiment of the invention.

Reference is now made to Figure 3 showing a circuit diagram of a second embodiment of the invention. Therein, the circuit is substantially similar with the one shown in Figure 1 and identical reference numerals are applied for identical functioning components. The frequency determining circuit consists of a first condenser 45 connected between the two cathodes 16, 26. Two capacitors 46, 48 are also connected to the two cathodes and have connected between them a material known as "Thyrite" 50. "Thyrite" material is described in a patent to McEachron, 1,822,742. "Thyrite" is a material which has the characteristic that its resistance decreases as the current applied to it increases. The amount of such resistance variation depends upon the size and other characteristics of the "Thyrite" material selected. The material is commercially available and its characteristics are predictable. A current is applied through isolating resistors 52, 54 to the "Thyrite" to change its resistance. As the current applied increases from a minimum to a maximum, the capacitance between the first and second tube cathodes changes from substantially that of the first condenser to substantially that of the first condenser and the condensers in series with the "Thyrite" in parallel. If desired, a variable current can be applied to the "Thyrite" and the output of the square-wave generator will accordingly be a series of frequency modulated square waves, the modulating frequency of which is determined by the frequency of the current being applied to the "Thyrite" element.

Using one type of "Thyrite" element, frequency ratios on the order of 20 to 1 were obtained in one embodiment of the invention. A frequency of 4 megacycles was smoothly reduced to 250 kilocycles merely by changing the current passing through the "Thyrite" element. In place of the potentiometer or "Thyrite" elements in the frequency determining circuit, other variable resistors may be used employing resistance elements having other current vs. resistance characteristics. Also an electronic variable resistance system may be used. However, for simplicity, the embodiments shown are preferred. If desired, the cathode load impedances may be replaced by constant current devices such as pentodes in accordance with the circuit shown in Figure 3 of my copending application identified above.

Accordingly, there has been shown and described a novel, simple, and useful multivibrator or square-wave generator wherein the frequency may be varied smoothly over a wide range. Furthermore, by the embodiments of the invention described herein a frequency modulated square-wave generator is also provided.

What is claimed is:

1. A variable frequency square-wave generator comprising a first and a second electron discharge tube each having cathode, anode, and control grid electrodes, each having an anode load resistor connected to its anode, each having a cathode load resistor connected to its cathode, the resistance of each of said cathode load resistors being greater than the resistance of each of said anode load resistors, means coupling said first tube grid to said second tube anode, means coupling said second tube grid to said first tube anode, and a frequency determining network connected between the cathodes of said first and second tubes including a first condenser, a second condenser, a variable resistor connected in series with said second condenser, said series connected second condenser and variable resistor being connected in parallel with said first condenser.

2. A variable frequency square-wave generator comprising a first and a second electron discharge tube each having cathode, anode, and control grid electrodes, each having an anode load resistor connected to its anode, each having a cathode load resistor connected to its cathode, means coupling said first tube grid to said second tube anode, means coupling said second tube grid to said first tube anode and a frequency determining network connected between the cathodes of said first and second tubes including a first condenser, a variable resistance element having the characteristic that its resistance value changes with a change in current applied thereto, second and third condensers connecting said variable resistance element across said first condenser and means to apply a current to said variable resistance element to vary its resistance whereby the frequency of said generator may be varied.

3. A variable frequency square-wave generator comprising a first and a second electron discharge tube each having cathode, anode, and control grid electrodes, each having an anode load impedance connected to its anode, each having a cathode load impedance connected to its cathode, each cathode load impedance exceeding in value its respective anode load impedance, a pair of cross coupling condensers each of which is coupled between the anode of one tube and the grid of the other tube, and a frequency determining network connected between the cathode of said first and second tubes including a first condenser, a second condenser, and resistive means and said second condenser being connected in series across said first condenser, and means to vary the value of said resistive means whereby the frequency of said generator may be varied.

4. A variable frequency square-wave generator comprising a first and a second electron discharge tube each having cathode, anode, and control grid electrodes, each having an anode load resistor connected to its anode, each having a cathode resistor connected to its cathode, the value of each cathode resistor exceeding the value of the anode load resistor in the associated tube, a pair of cross-coupling condensers each of which is coupled between the anode of one tube and the grid of the other tube, the values of said condensers being selected to provide cross coupling time constants which are relatively long compared to the period of oscillation of said generator, a first condenser connected between the cathodes of said first and second tubes, a second condenser, variable resistance means, said variable resistance means and said second condenser being connected in series and across said first condenser, and means to vary said variable resistance whereby the frequency of said generator may be varied.

5. A variable frequency square-wave generator comprising a first and a second electron discharge tube each having cathode, anode and control grid electrodes, each having an anode load resistor connected to its anode, each having a cathode resistor connected to its cathode, the value of each cathode resistor exceeding the value of the anode load resistor in the associated tube, a pair of cross-coupling condensers each of which is coupled between the anode of one tube and the grid of the other tube, the values of said condensers being selected to provide cross-coupling time constants which are relatively long compared to the period of oscillation of said generator, a first condenser connected between the cathodes of said first and second tubes, a variable resistance element, said resistance element having the characteristic that its resistance changes with changes in current being applied, second and third condensers respectively coupling said variable resistance element across said first condenser and means to apply a current to said variable resistance element to vary its resistance whereby the frequency of said generator may be varied.

6. A variable frequency square-wave generator as recited in claim 5 wherein said variable resistance element is a "Thyrite" element.

References Cited in the file of this patent

UNITED STATES PATENTS

| | | |
|---|---|---|
| 2,483,823 | George | Oct. 4, 1949 |
| 2,633,535 | Daskam | Mar. 31, 1953 |

OTHER REFERENCES

"Waveforms" by Chance et al., first ed. 1949, published by McGraw-Hill Book Co., Inc., New York, New York, pages 172–173.